United States Patent
Guan et al.

(10) Patent No.: US 9,042,142 B2
(45) Date of Patent: May 26, 2015

(54) MULTI-LEVEL VOLTAGE CONVERTER

(75) Inventors: Eryong Guan, Beijing (CN); Niko Railo, Beijing (CN); Aiping Wu, Beijing (CN)

(73) Assignee: ABB Technology Ltd., Zurich (CH)

( * ) Notice: Subject to any disclaimer, the term of this patent is extended or adjusted under 35 U.S.C. 154(b) by 135 days.

(21) Appl. No.: 13/821,081

(22) PCT Filed: Dec. 13, 2010

(86) PCT No.: PCT/CN2010/079713
§ 371 (c)(1),
(2), (4) Date: Mar. 6, 2013

(87) PCT Pub. No.: WO2012/079213
PCT Pub. Date: Jun. 21, 2012

(65) Prior Publication Data
US 2013/0176014 A1    Jul. 11, 2013

(51) Int. Cl.
H02M 7/44 (2006.01)
G05F 3/08 (2006.01)
H02M 7/483 (2007.01)

(52) U.S. Cl.
CPC  *G05F 3/08* (2013.01); *H02M 7/483* (2013.01)

(58) Field of Classification Search
USPC  ......... 363/10, 17, 59, 60, 71, 72, 97, 98, 123, 363/124, 131, 132
See application file for complete search history.

(56) References Cited

U.S. PATENT DOCUMENTS 7,639,515 B2    12/2009  Ponnaluri et al.
2007/0235293 A1*  10/2007  Steimer et al. .................... 200/2

FOREIGN PATENT DOCUMENTS

| CN | 1625037 A | 6/2005 |
|---|---|---|
| CN | 100386959 C | 5/2008 |
| CN | 100521506 C | 7/2009 |
| JP | 2010213562 A | 9/2010 |
| WO | WO2010044164 A1 | 4/2010 |

OTHER PUBLICATIONS

The State Intellectual Property Office, P.R. China, International Search Report re International Application No. PCT/CN2010/079713, dated Sep. 29, 2011.

* cited by examiner

*Primary Examiner* — Nguyen Tran
(74) *Attorney, Agent, or Firm* — Robert A. Jefferis; Driggs, Hogg, Daugherty & Del Zoppo Co., LPA

(57) ABSTRACT

The invention discloses a voltage source converter and a voltage source converter system. The voltage source converter comprises: a multi-level voltage source converter, being adapted to output a multiple levels of a first voltage at one of two first output terminals through a multiple of first conducting paths; a first energy store; and a first switching element, being arranged to directly connected with the first output terminal, and being adapted to switch the first energy store in or out of the first conducting path so as to combine a level of the voltage of the first energy store with the level of the first voltage as a second voltage output at a second output terminal. By having the topology as above, the voltage class of each of the power semiconductors can be kept lower with the number of the power semiconductors unchanged. Besides, $V_{DRM}$ is lowed as compared to conventional topology. This renders the reduction of the cost and the increase of the liability.

18 Claims, 9 Drawing Sheets

MULTI-LEVEL VOLTAGE CONVERTER

RELATED APPLICATION

This application is a national filing of PCT application Serial No. PCT/CN2010/079713, filed Dec. 13, 2010.

TECHNICAL FIELD

The invention relates to the field of voltage source converter, and more particularly to multi-level voltage source converter (VSC).

BACKGROUND ART

Currently, multi-level voltage source converter is widely used, which can equivalently decrease the switching frequency and improve the output waveform quality.

FIG. 1 illustrates a topology according to a conventional multi-level voltage converter, wherein a switching gear cell 1 includes a first energy store 100 and a second energy store 101 connected in series with power semiconductors for switching, for example, five voltage levels. A first, second, third and fourth power semiconductors 110, 111, 112, 113 are connected in series, a fifth and sixth power semiconductors 114, 115 are connected in series. The first and fourth power semiconductors 110, 114 are respectively connected with the first and second energy stores 100, 101, and the junction point A between the first and second energy stores 100, 101, the junction point B between the fifth and sixth power semiconductors 114, 115, and the junction point C between the second and third power semiconductors 111,112 are connected with each other. The switching gear cell further includes a seventh, eighth, ninth and tenth power semiconductors 116, 117, 118, 119 are connected in series, a eleventh and twelfth power semiconductors 120, 121 are connected in series. The seventh and tenth power semiconductors 116, 119 are respectively connected with the first and second energy stores 100, 101, and the junction point A between the first and second energy stores 100, 101, the junction point D between the eleventh and twelfth power semiconductors 120, 121 are connected with each other. The junction point between the eighth and ninth power semiconductors 117,118 is arranged for output terminal for outputting the multi-level voltage, for example, a five-level voltage as shown at the right side of FIG. 1. Each of the first, second, third, fourth, seventh, eighth, ninth and tenth power semiconductors 110, 111, 112, 113, 116, 117, 118, 119 is a drivable unidirectional power semiconductor switch with an anti-paralleled uncontrolled unidirectional current-carrying semiconductor, such as IGCT or IGBT etc., and each of the fifth, sixth, eleventh, and twelfth power semiconductors is a uncontrolled unidirectional current-carrying direction power semiconductor, such as power diode.

FIG. 2 illustrates a topology according to another conventional multi-level voltage converter. As shown in FIG. 2, a switching gear cell 2 uses cascaded H-bridges. The first H-bridge of the switching gear cell 2 includes a first energy store 200, a first and second power semiconductors 210, 211 connected in series, a third and fourth power semiconductors 212, 213 connected in series. And, the first energy store 200, the first power semiconductor 210 and the third power semiconductor 212 are connected with each other at junction point A, the first energy store 200, the second power semiconductor 211 and the fourth power semiconductor 213 are connected with each other at junction point B. The second bridge of the switching gear cell 2 has a similar topology as to the first H-bridge, which includes a second energy store 201, a fifth, sixth, seventh, and eighth power semiconductors 214, 215, 216, 217. The junction point between the first and second power semiconductors 210, 211 and the junction point between the fifth and sixth power semiconductors 214, 215 are connected with each other. The voltage is output between the junction point between the third and fourth power semiconductors and the junction point between the seventh and eighth power semiconductors. The output voltage waveform is shown at the right side of FIG. 2. Each of the first, second, third, fourth, fifth, sixth, seventh, eighth power semiconductors is a drivable unidirectional power semiconductor switch with an anti-paralleled uncontrolled unidirectional current-carrying semiconductor.

FIG. 3 illustrates a topology according to another conventional multi-level voltage converter. As shown in FIG. 3, wherein a switching gear cell 3 includes a first energy store 300 and a second energy store 301 connected in series with power semiconductors for switching, for example, five voltage levels. A first, second, third and fourth power semiconductors 410, 411, 412, 413 are connected in series, a fifth and sixth power semiconductors 414, 415 are connected in series. The first and fourth power semiconductors 410, 413 are respectively connected with the first and second energy stores 400, 401, and the junction point A between the first and second energy stores 400, 401, the junction point B between the fifth and sixth power semiconductors 414, 415 are connected with each other. The switching gear cell further includes a third energy store 402, a seventh and eighth power semiconductors 416, 417 connected in series, and a ninth and tenth power semiconductors 418, 419 connected in series. One end of the third energy store 402, the seventh and ninth power semiconductors 416, 418 are connected with each other, and the other end of the third energy store 402, the eighth and tenth power semiconductors 417, 419 are connected with each other. Furthermore, the junction point between the second and third second and third power semiconductors 411, 412 is connected with the junction point between the ninth and tenth power semiconductors 418, 419. The voltage is output at the junction point between the seventh and eighth power semiconductors 416, 417. Each of the first, second, third, fourth, seventh, eighth, ninth and tenth power semiconductors is a drivable unidirectional power semiconductor switch with an anti-paralleled uncontrolled unidirectional current-carrying semiconductor, and each of the fifth and sixth power semiconductors is a uncontrolled unidirectional current-carrying direction power semiconductor. Its output waveform is shown at the right side of FIG. 3.

From analysis of the multi-level voltage converter according to each of FIGS. 1, 2 and 3, such conventional topology has at least drawbacks as that: it requires a relatively large number of power semiconductors, which increases the cost of the multi-level voltage converter but decreases the reliability. In addition, the repetitive peak off-state voltage of each of the power semiconductors according to FIGS. 1 to 3 is described as $V_{DRM}=(1.8\sim2.2)Vdc$.

Another conventional multi-level voltage converter is disclosed by patent, U.S. Pat. No. 7,639,515. A switchgear has a first energy store and a second energy store connected in series, a first, second, third and fourth power semiconductor switch connected in series. The first and fourth power semiconductor are respectively connected to the first energy store and the second energy store. A third energy store is connected to the junction between the first and the second power semiconductor and the junction between the third and the fourth semiconductor. Furthermore, it includes a switching element connected directly to the junction pint between the second and the third power semiconductor and directly to the junction point between the first energy store and the second energy store. An estimation of the magnitude of its output is needed in expression of ration with Vdc as: Vout=2×Vdc/1.414/1.1. U.S. Pat. No. 7,639,515 has at least drawbacks as that: 1. Due to a lower ration between the Vout and Vdc, it requires a higher voltage class of the power semiconductors, the power capacitor, and all the components of the converter related to the DC link. Higher voltage class of power semiconductor, power capacitor and all the related components leads to higher cost of voltage converter. 2. It requires a relatively large number of power semiconductors, which increases also the cost of the multi-level voltage converter but decreases the reliability.

BRIEF SUMMARY OF THE INVENTION

It is therefore an objective of the invention to provide a voltage source converter and a voltage source converter system integrating the same.

According to an embodiment of the invention, a voltage source converter comprises: a multi-level voltage source converter, being adapted to output a multiple levels of a first voltage at one of two first output terminals through a multiple of first conducting paths; a first energy store; and a first switching element, being arranged to directly connected with the first output terminal, and being adapted to switch the first energy store in or out of the first conducting path so as to combine a level of the voltage of the first energy store with the level of the first voltage as a second voltage output at a second output terminal. By having the topology as above, the voltage class of each of the power semiconductors can be kept lower with the number of the power semiconductors unchanged. Besides, $V_{DRM}$ is lowed as compared to conventional topology. This renders the reduction of the cost and the increase of the liability.

According to another embodiment of the invention, a voltage source converter system comprises: a voltage source converter according to each of previous claims, being adapted to output a multiple levels of the second voltage at one of two second output terminals in a multiple of the first conducting paths; a fourth energy store; and a second switching element, being arranged to directly connected with the second output terminal, and being adapted to switch the fourth energy store in or out of the first conducting path so as to combine a level of the voltage of the fourth energy store with the level of the second voltage as a third voltage output at a third output terminal. By having the topology as above, the voltage class of each of the power semiconductors can be kept lower with the number of the power semiconductors unchanged relative to the number of output voltage level. In addition, since the addition of further switching element (such as the second switching element and the fourth energy store) of next stage does not depend on the topology of the converter of previous stage, the number of level of the output voltage can be raised with the incorporation of more switching element for next stage without corresponding modification of the previous stage. This renders the reduction of the cost and the increase of the liability.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
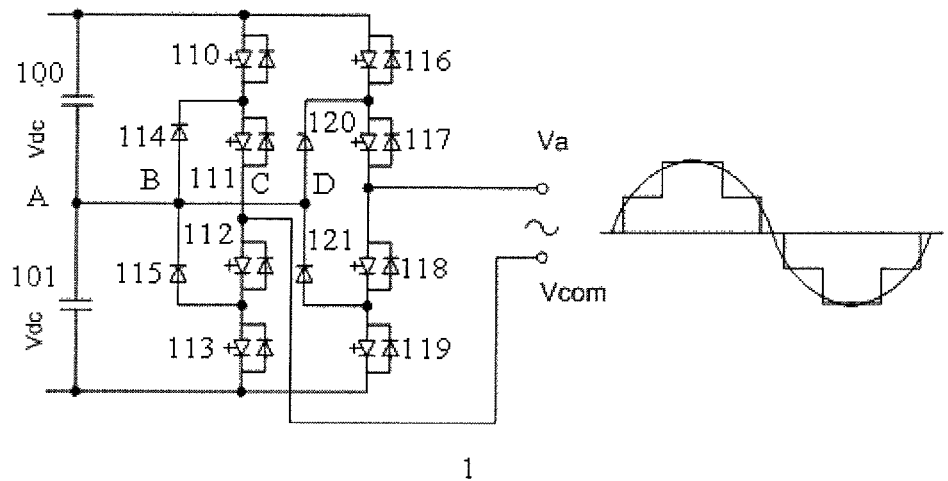
FIG. 1 illustrates a topology according to a conventional multi-level voltage converter.
Figure 2:
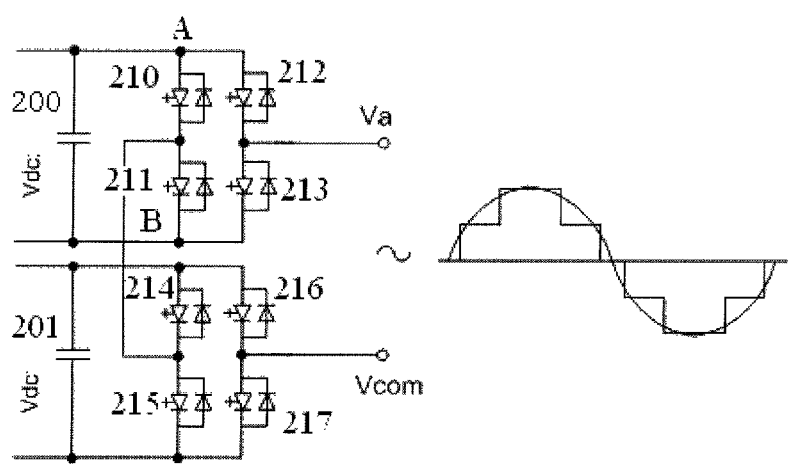
FIG. 2 illustrates a topology according to another conventional multi-level voltage converter.
Figure 3:
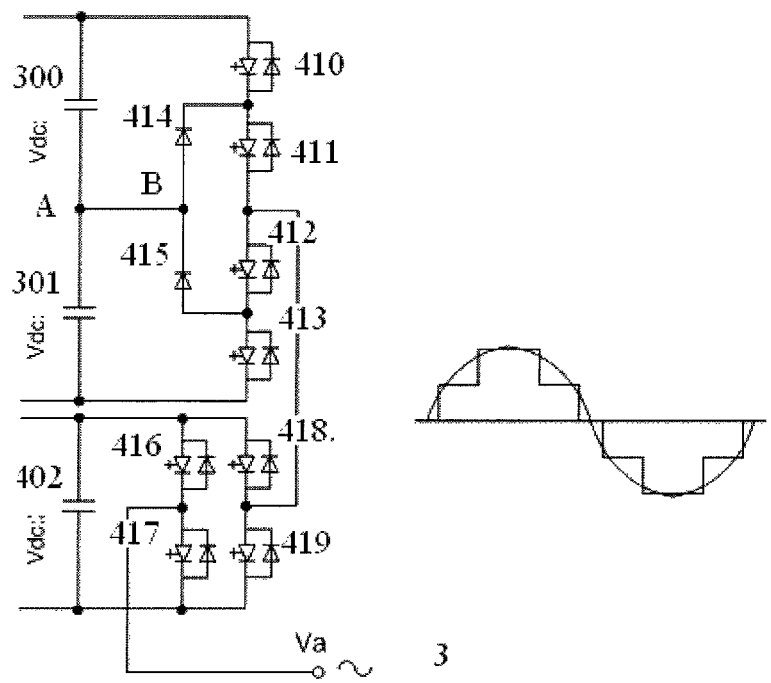
FIG. 3 illustrates a topology according to another conventional multi-level voltage converter.
Figure 4:
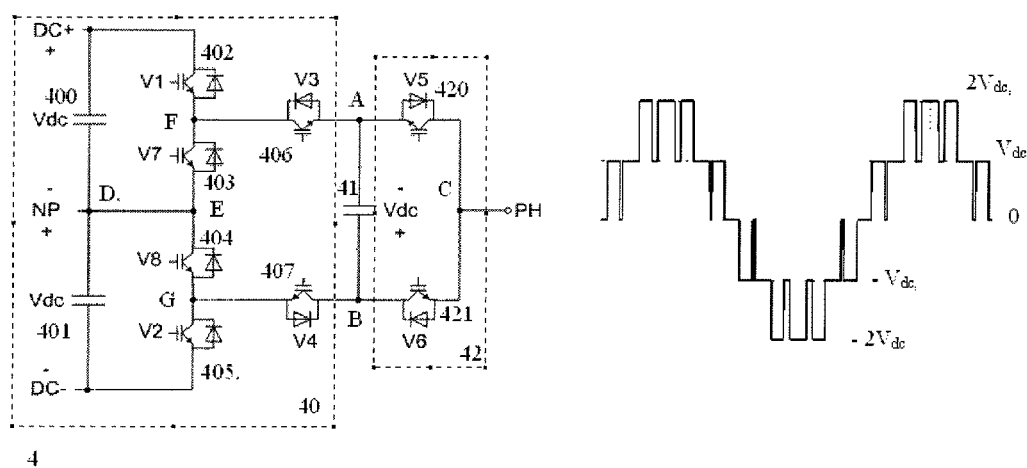
FIG. 4 illustrates a topology according to an embodiment of present invention.

FIG. 4 illustrates a topology according to an embodiment of present invention. As shown in FIG. 4, a voltage source converter 4 comprises a multi-level voltage source converter 40, a first energy store 41, and a first switching element 42. The multi-level voltage source converter 40 can output a multiple levels of first voltage. The first voltage is arranged to be output at one of two first output terminals A and B through a multiple of first conducting paths P1. According to each switching state of the multi-level voltage source converter, one of the first conducting paths P1 is selected with switching-on some of the power semiconductors used in it, which will be described in detail later. The first energy store 41 can store electrical energy, such as power capacitor. The first switching element 42 is directly connected with the first output terminals A and B, and it can switch the first energy store 41 in or out of the first conducting path P1 so as to combine a level of the voltage of the first energy store with the level of the first voltage as a second voltage output at a second output terminal C. For example, if the voltage level of the first energy store is $V_{dc}$, and the voltage level of the first voltage is $V_{dc}$, 0, or $-V_{dc}$, then the second voltage output is $2V_{dc}$, $V_{ac}$, 0, or $-V_{dc}$, or $-2V_{dc}$, which is a five-level output.

The multi-level voltage source converter 40 comprises a second energy store 400, a third energy store 401. The second energy store 400 and the third energy store 401 are connected in series at junction point D. They can be of power capacitor and hold voltages with the same or different level. For example, the voltage level across either of the energy stores can be $V_{dc}$. The multi-level voltage source converter 40 also includes a first, a second, a third and a fourth power semiconductors 402, 403, 404, 405, which are connected in series. The first power semiconductor 402 is connected to the second energy store 400 at a point opposite to the junction point D, and the fourth power semiconductor 405 is connected to the third energy store 401 at a point opposite to the junction point D. The junction point D between the second and the third energy stores 400, 401 is connected to the junction point E between the second and the third power semiconductors 403, 404. The multi-level voltage source converter 40 also comprises a fifth power semiconductor 406 and a sixth power semiconductor 407. The fifth power semiconductor 406 is connected between the junction point F between the first and second power semiconductors 402, 403 and one of the first output terminals A and in series with the first power semiconductor, and the sixth power semiconductor 407 is connected between the junction point G between the third and fourth power semiconductors 404, 405 and the other of the first output terminals B and in series with the fourth power semiconductor.

Each of the first, second, third, fourth, fifth and sixth power semiconductors is a drivable unidirectional power semiconductor switch with an anti-paralleled uncontrolled unidirectional current-carrying semiconductor, such as IGCT or IGBT etc.

Based on the switching state of each of the power semiconductors, the first conducting path P1 can lead through:
1. the junction point between the second energy store 400 and the first power semiconductor 402, the switching-on first power semiconductor 402, the switching-on fifth power semiconductor 406, and the first output terminal A; the first voltage level at the first output terminal A is the voltage level of the second energy store 400, for example $V_{dc}$;
2. the junction point between the second energy store 400 and the first power semiconductor 402, the free-wheeling first power semiconductor 402, the free-wheeling fifth power semiconductor 406, and the first output terminal A; the first voltage level at the first output terminal A is the voltage level of the second energy store 400, for example $V_{dc}$;
3. the junction point D between the second and third energy stores 400, 401, the free-wheeling second power semiconductor 403, the switching-on fifth power semiconductor 406, and the first output terminal A; the first voltage level at the first output terminal A is the voltage level at junction point D (NP), for example 0;
4. the junction point D between the second and third energy stores 400, 401, the free-wheeling third power semiconductor 404, the switching-on sixth power semiconductor 407, and the first output terminal B; the first voltage level at the first output terminal B is the voltage level at junction point D (NP), for example 0;
5. the junction point between the third energy store 401 and the fourth power semiconductor 405, the switching-on fourth power semiconductor 405, the switching-on sixth power semiconductor 407, and the first output terminal B; the first voltage level at the first output terminal B is the voltage level of the second energy store 400, for example $-V_{dc}$; or
6. the junction point between the third energy store 401 and the fourth power semiconductor 405, the free-wheeling fourth power semiconductor 405, the free-wheeling sixth power semiconductor 407, and the first output terminal B; the first voltage level at the first output terminal B is the voltage level of the second energy store 400, for example $-V_{dc}$.

By have such configuration and switching states, the multi-level voltage source converter 40 can output three-level voltage independent of the configuration and the switching states of the converter cascaded down with it. Besides, the number of power semiconductor is lower. Furthermore, the repetitive peak off-state voltage of each of the power semiconductors is reduced.

Figure 5:
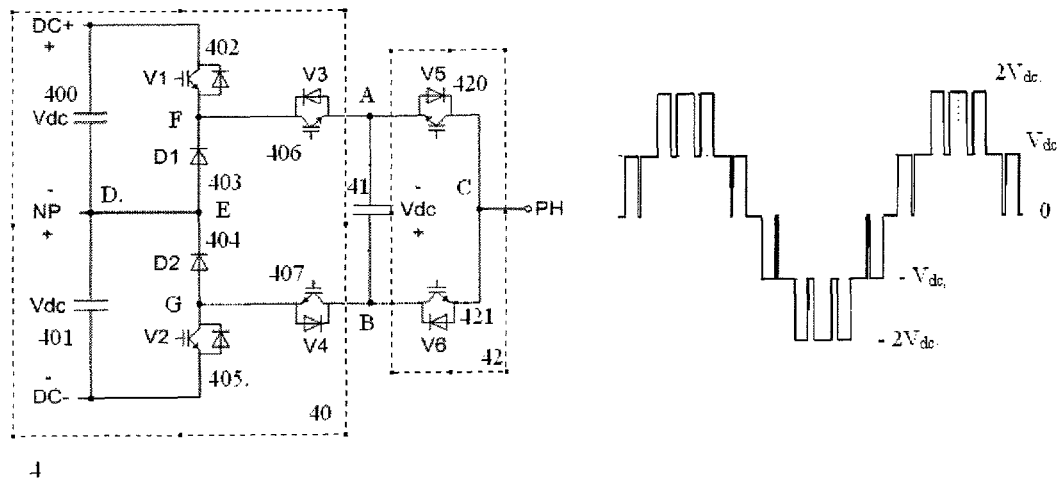
FIG. 5 illustrates an alternative topology to the embodiment of FIG. 4.

FIG. 5 illustrates an alternative topology to the embodiment of FIG. 4. The difference therebetween is that the second and third power semiconductors 403, 404 are replaced by uncontrolled unidirectional current-carrying direction power semiconductors, such as power diode. The second power semiconductor 403 is connected with the first power semiconductor 402 in anti-series, and the third power semiconductor 404 is connected with the fourth power semiconductor 405 in anti-series.

By having such replacement, the cost of the voltage source converter is reduced without loosing valid states.

As shown in FIGS. 4 and 5, the first switching element 42 comprises a seventh and eighth semiconductors 420, 421 connected in series at junction point C. In addition, the seventh power semiconductor 420 is connected to the fifth power semiconductor 406 at junction point A in anti-series, and the eighth power semiconductor 421 is connected to the sixth power semiconductor 407 at junction point B in anti-series. Therefore, the first energy store 41 is connected with the first switching element in parallel between the two first output terminals A and B. Either of the seventh and eighth is a drivable unidirectional power semiconductor switch with an anti-paralleled uncontrolled unidirectional current-carrying semiconductor.

By having the configuration of the switching element, the first conducting path can further lead through:
1. the first energy store 41, the switching-on eighth power semiconductor 421 and the second output terminal C;
2. the switching-on seventh power semiconductor 420 and the second output terminal C;
3. the switching-on eighth power semiconductor 421 and the second output terminal C; or
4. the first energy store, 41 the switching-on seventh power semiconductor 420 and the second output terminal C.

The second output terminal C is to output the second voltage, which is deemed as the output of the voltage source converter.

FIGS. 5A to 5H illustrate the first conducting paths in each of the valid states according to the embodiments of FIG. 5. The arrow in each of the figures indicates the conducting path P1. For convenience of reading, the first, fourth, fifth, sixth, seventh and eighth power semiconductors are referenced as V1, V2, V3, V4, V5 and V6, the second and third power semiconductors are referenced as D1, D2. Output voltage is the output at the second output terminal C, and for the purpose of specification, the voltage level of each of the first, second and third energy stores 41, 400, 401 is $V_{dc}$ with voltage polarity indicated in the figures. The row of "voltage" shows the voltage across each of the power semiconductors under each of the switching states.

Figure 5A:
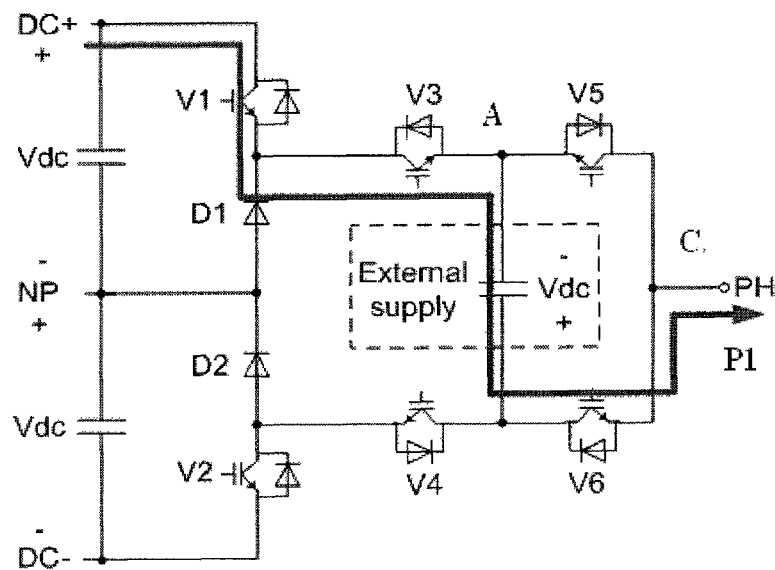
FIGS. 5A to 5H illustrate the switching states of the topology to the embodiment of FIG. 5.

The switching state of each of the power semiconductors according to FIG. 5A is described as in table I.

TABLE I

| Switching state | V1 | V2 | V3 | V4 | V5 | V6 | Output voltage | D1 | D2 |
|---|---|---|---|---|---|---|---|---|---|
| S1 | 1 | 0 | 1 | 0 | 0 | 1 | 2 * Vdc | N/A | N/A |
| $V_{DRM}$ | 0 | Vdc/2 | 0 | Vdc | Vdc | 0 |  | Vdc | Vdc/2 |

Under the switching state of table I, the first conducting path P1 is bidirectional. As shown in FIG. 5A, the first conducting path P1 leads through the junction point between the second energy store and the first power semiconductor V1, the switching-on/free-wheeling first power semiconductor V1, the switching-on/free-wheeling fifth power semiconductor V3, and the first output terminal A; the first voltage level at the first output terminal A is $V_{dc}$. Furthermore, from the first output terminal A, the first conducting path P1 leads through the first energy store 41, the switching-on/free-wheeling eighth power semiconductor V6 and the second output terminal C. With respect to point NP, the voltage output at the second output terminal C is $2V_{dc}$.

Figure 5B:
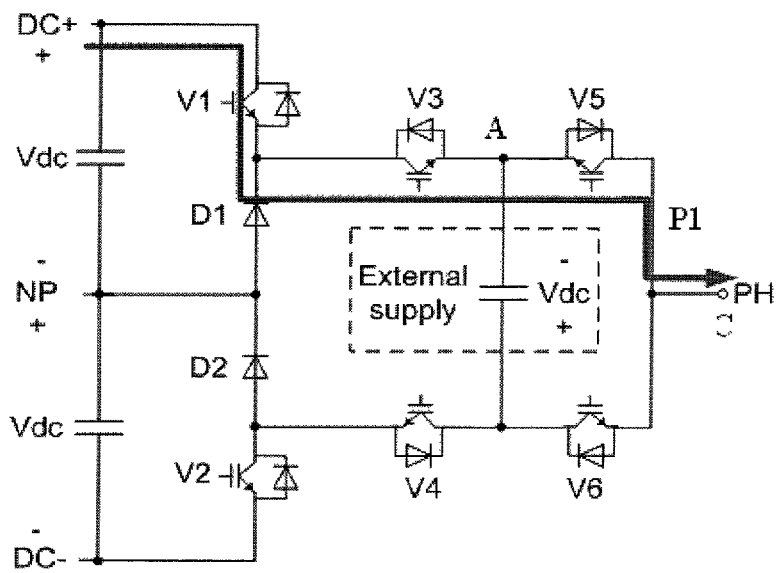

The switching state of each of the power semiconductors according to FIG. 5B is described as in table II.

TABLE II

| Switching state | V1 | V2 | V3 | V4 | V5 | V6 | Output voltage | D1 | D2 |
|---|---|---|---|---|---|---|---|---|---|
| S2 | 1 | 0 | 1 | 0 | 1 | 0 | Vdc | N/A | N/A |
| $V_{DRM}$ | 0 | Vdc/2 | 0 | Vdc | 0 | Vdc | | Vdc | Vdc/2 |

Under the switching state of table II, the first conducting path P1 is unidirectional. As shown in FIG. 5B, the first conducting path P1 leads through the junction point between the second energy store and the first power semiconductor V1, the switching-on first power semiconductor V1, the switching-on fifth power semiconductor V3, and the first output terminal A; the first voltage level at the first output terminal A is Vdc. Furthermore, from the first output terminal A, the first conducting path P1 leads through the switching-on seventh power semiconductor V5 and the second output terminal C. With respect to point NP, the voltage output at the second output terminal C is Vdc.

Figure 5C:
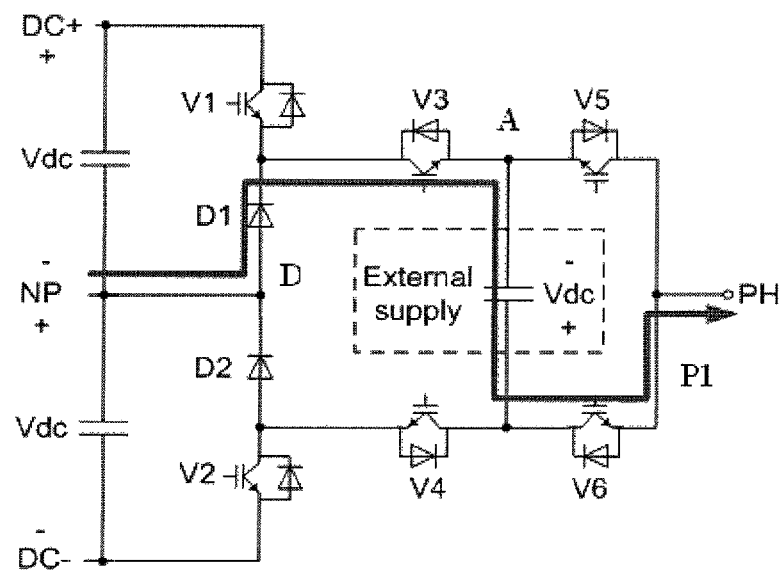

The switching state of each of the power semiconductors according to FIG. 5C is described as in table III.

TABLE III

| Switching state | V1 | V2 | V3 | V4 | V5 | V6 | Output voltage | D1 | D2 |
|---|---|---|---|---|---|---|---|---|---|
| S3 | 0 | 0 | 1 | 0 | 0 | 1 | Vdc | N/A | N/A |
| $V_{DRM}$ | Vdc | Vdc/2 | 0 | Vdc | Vdc | 0 | | 0 | Vdc/2 |

Under the switching state of table III, the first conducting path P1 is unidirectional. As shown in FIG. 5B, the first conducting path P1 leads through the junction point D between the second and third energy stores, the free-wheeling second power semiconductor, the switching-on fifth power semiconductor V3, and the first output terminal A; the first voltage level at the first output terminal A is 0. Furthermore, from the first output terminal A, the first conducting path P1 leads through the first energy store 41, the switching-on eighth power semiconductor V6 and the second output terminal C. With respect to point NP, the voltage output at the second output terminal C is $V_{dc}$.

Figure 5D:
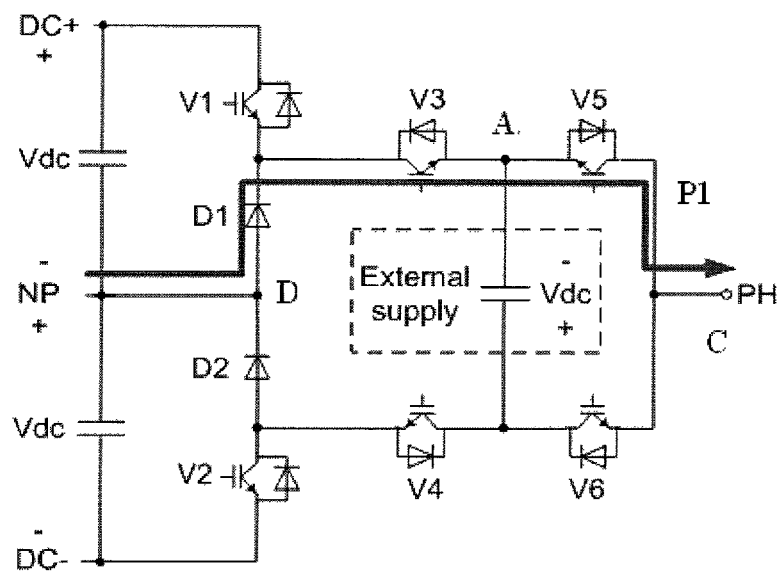

The switching state of each of the power semiconductors according to FIG. 5D is described as in table IV.

TABLE IV

| Switching state | V1 | V2 | V3 | V4 | V5 | V6 | Output voltage | D1 | D2 |
|---|---|---|---|---|---|---|---|---|---|
| S4 | 0 | 0 | 1 | 0 | 1 | 0 | 0 | N/A | N/A |
| $V_{DRM}$ | Vdc | Vdc/2 | 0 | Vdc | 0 | Vdc | | 0 | Vdc/2 |

Under the switching state of table IV, the first conducting path P1 is unidirectional. As shown in FIG. 5D, the first conducting path P1 leads through the junction point D between the second and third energy stores, the free-wheeling second power semiconductor D1, the switching-on fifth power semiconductor V3, and the first output terminal A. Furthermore, from the first output terminal A, the first conducting path P1 leads through the switching-on seventh power semiconductor V5 and the second output terminal C. With respect to point NP, the voltage output at the second output terminal C is 0.

Figure 5E:
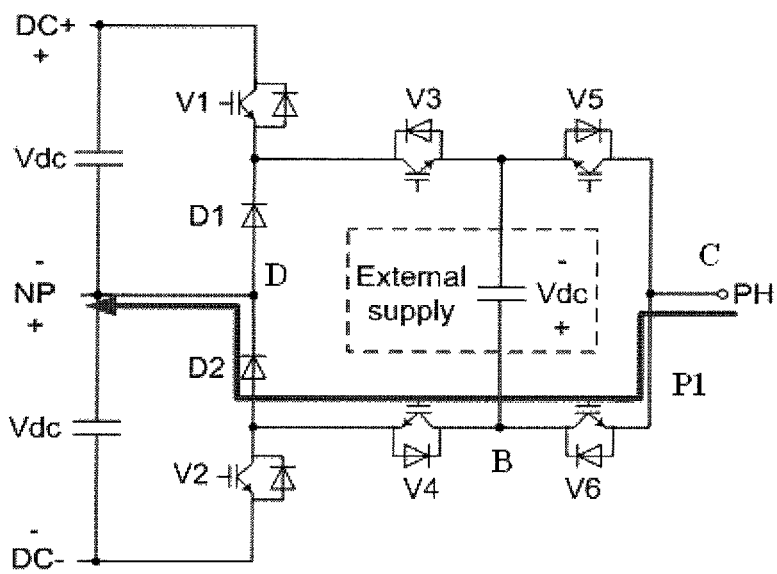

The switching state of each of the power semiconductors according to FIG. 5E is described as in table V.

TABLE V

| Switching state | V1 | V2 | V3 | V4 | V5 | V6 | Output voltage | D1 | D2 |
|---|---|---|---|---|---|---|---|---|---|
| S5 | 0 | 0 | 0 | 1 | 0 | 1 | 0 | N/A | N/A |
| $V_{DRM}$ | Vdc/2 | Vdc | Vdc | 0 | Vdc | 0 | | Vdc/2 | 0 |

Under the switching state of table V, the first conducting path P1 is unidirectional. As shown in FIG. 5E, the first conducting path P1 leads through the junction point D between the second and third energy stores, the free-wheeling third power semiconductor D2, the switching-on sixth power semiconductor V4, and the first output terminal B; the first voltage level at the first output terminal B is the voltage level at junction point D (NP), for example 0. Furthermore, from the first output terminal B, the first conducting path P1 leads through the free-wheeling eighth power semiconductor V6 and the second output terminal C. With respect to point NP, the voltage output at the second output terminal C is 0.

Figure 5F:
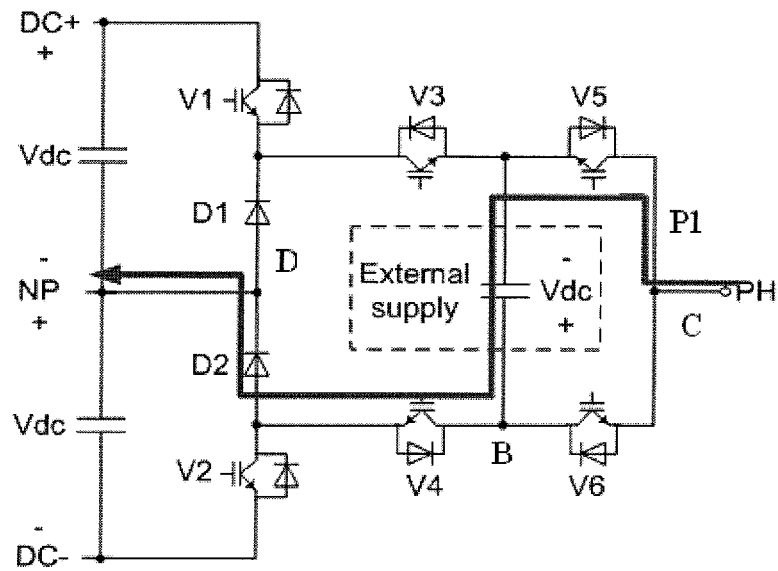

The switching state of each of the power semiconductors according to FIG. 5F is described as in table VI.

TABLE VI

| Switching state | V1 | V2 | V3 | V4 | V5 | V6 | Output voltage | D1 | D2 |
|---|---|---|---|---|---|---|---|---|---|
| S6 | 0 | 0 | 0 | 1 | 1 | 0 | −Vdc | N/A | N/A |
| $V_{DRM}$ | Vdc/2 | Vdc | Vdc | 0 | 0 | Vdc | | Vdc/2 | 0 |

Under the switching state of table VI, the first conducting path P1 is unidirectional. As shown in FIG. 5F, the first conducting path P1 leads through the junction point D between the second and third energy stores, the free-wheeling third power semiconductor D2, the switching-on sixth power semiconductor V4, and the first output terminal B; the first voltage level at the first output terminal B is the voltage level at junction point D (NP), for example 0. Furthermore, from the first output terminal B, the first conducting path P1 leads through the first energy store 41, the switching-on seventh power semiconductor V5 and the second output terminal C. With respect to point NP, the voltage output at the second output terminal C is $-V_{dc}$.

Figure 5G:
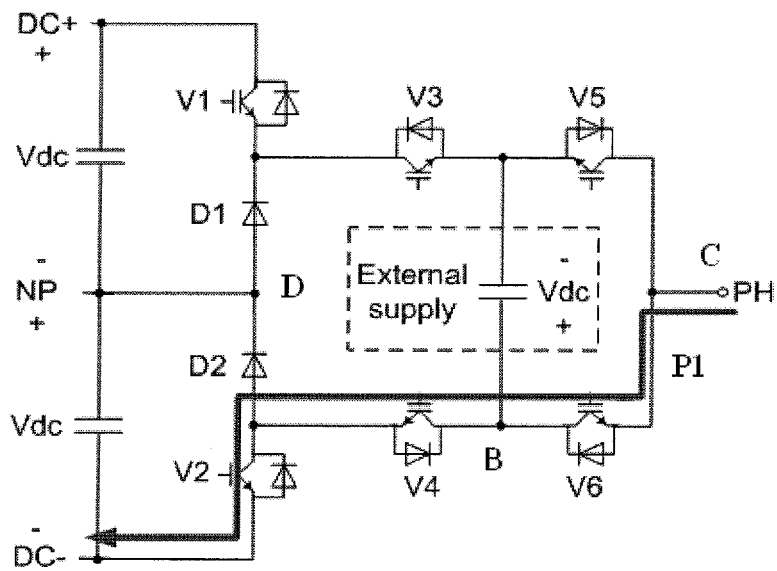

The switching state of each of the power semiconductors according to FIG. 5G is described as in table VII.

TABLE VII

| Switching state | V1 | V2 | V3 | V4 | V5 | V6 | Output voltage | D1 | D2 |
|---|---|---|---|---|---|---|---|---|---|
| S7 | 0 | 1 | 0 | 1 | 0 | 1 | −Vdc | N/A | N/A |
| $V_{DRM}$ | Vdc/2 | 0 | Vdc | 0 | Vdc | 0 | | Vdc/2 | Vdc |

Under the switching state of table VII, the first conducting path P1 is bidirectional. As shown in FIG. 5G, the first conducting path P1 leads through the junction point between the third energy store 401 and the fourth power semiconductor V2, the switching-on/free-wheeling fourth power semiconductor V2, the switching-on/free-wheeling sixth power semiconductor V4, and the first output terminal B; the first voltage level at the first output terminal B is the voltage level at junction point D (NP), for example 0. Furthermore, from the first output terminal B, the first conducting path P1 leads through the free-wheeling/switching-on eighth power semiconductor V6 and the second output terminal C. With respect to point NP, the voltage output at the second output terminal C is $-V_{dc}$.

Figure 5H:
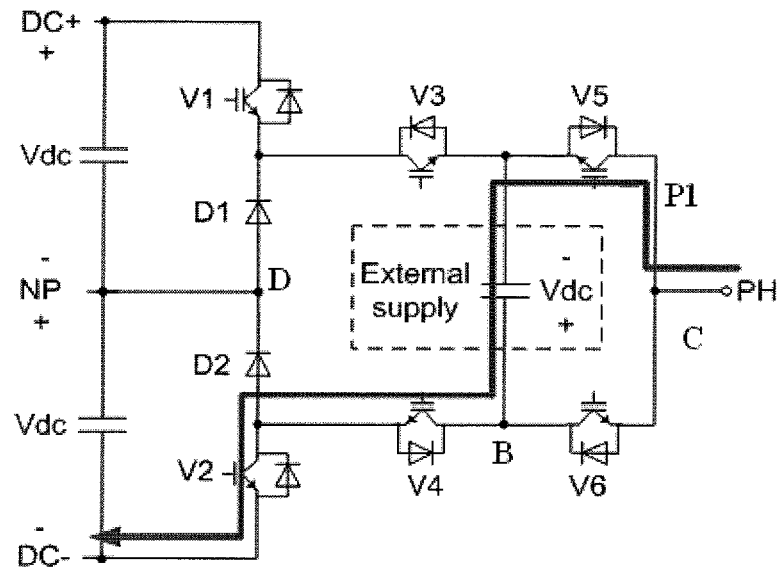

The switching state of each of the power semiconductors according to FIG. 5H is described as in table VIII.

TABLE VIII

| Switching state | V1 | V2 | V3 | V4 | V5 | V6 | Output voltage | D1 | D2 |
|---|---|---|---|---|---|---|---|---|---|
| S8 | 0 | 1 | 0 | 1 | 1 | 0 | $-2 * Vdc$ | N/A | N/A |
| $V_{DRM}$ | Vdc/2 | 0 | Vdc | 0 | 0 | Vdc | | Vdc/2 | Vdc |

Under the switching state of table VIII, the first conducting path P1 is bidirectional. As shown in FIG. 5H, the first conducting path P1 leads through the junction point between the third energy store 401 and the fourth power semiconductor V2, the switching-on/free-wheeling fourth power semiconductor V2, the switching-on/free-wheeling sixth power semiconductor V4, the first energy store, the switching-on seventh power semiconductor and the second output terminal B; the first voltage level at the first output terminal B is the voltage level at junction point D (NP), for example $-V_{dc}$. Furthermore, from the first output terminal B, the first conducting path P1 leads through the free-wheeling/switching-on seventh power semiconductor V5 and the second output terminal C. With respect to point NP, the voltage output at the second output terminal C is $-2V_{dc}$.

By having the topology as above, the voltage class of each of the power semiconductors can be kept lower with the number of the power semiconductors unchanged. Besides, $V_{DRM}$ is lowed as compared to conventional topology. This renders the reduction of the cost and the increase of the liability.

As compared with the topology according to FIG. 5, the topology according to FIG. 4 is adapted to have some redundant switching states as below:

a. the first conducting path P1 leads through the junction point D between the second and third energy stores, the switching-on second power semiconductor, the free-wheeling fifth power semiconductor V3, and the first output terminal A; the first voltage level at the first output terminal A is 0. Furthermore, from the first output terminal A, the first conducting path P1 leads through the first energy store 41, the free-wheeling eighth power semiconductor V6 and the second output terminal C. With respect to point NP, the voltage output at the second output terminal C is $V_{dc}$;

b. the first conducting path P1 leads through the junction point D between the second and third energy stores, the switching-on second power semiconductor D1, the free-wheeling fifth power semiconductor V3, and the first output terminal A. Furthermore, from the first output terminal A, the first conducting path P1 leads through the free-wheeling seventh power semiconductor V5 and the second output terminal C. With respect to point NP, the voltage output at the second output terminal C is 0;

c. the first conducting path P1 leads through the junction point D between the second and third energy stores, the switching-on third power semiconductor D2, the free-wheeling sixth power semiconductor V4, and the first output terminal B; the first voltage level at the first output terminal B is the voltage level at junction point D (NP), for example 0. Furthermore, from the first output terminal B, the first conducting path P1 leads through the switching-on eighth power semiconductor V6 and the second output terminal C. With respect to point NP, the voltage output at the second output terminal C is 0; or d. the first conducting path P1 leads through the junction point D between the second and third energy stores, the switching-on third power semiconductor D2, the free-wheeling sixth power semiconductor V4, and the first output terminal B; the first voltage level at the first output terminal B is the voltage level at junction point D (NP), for example 0. Furthermore, from the first output terminal B, the first conducting path P1 leads through the first energy store 41, the free-wheeling seventh power semiconductor V5 and the second output terminal C. With respect to point NP, the voltage output at the second output terminal C is $-V_{dc}$.

e. These redundant switching states is helpful for increasing the liability of the voltage source converter.

Figure 6:
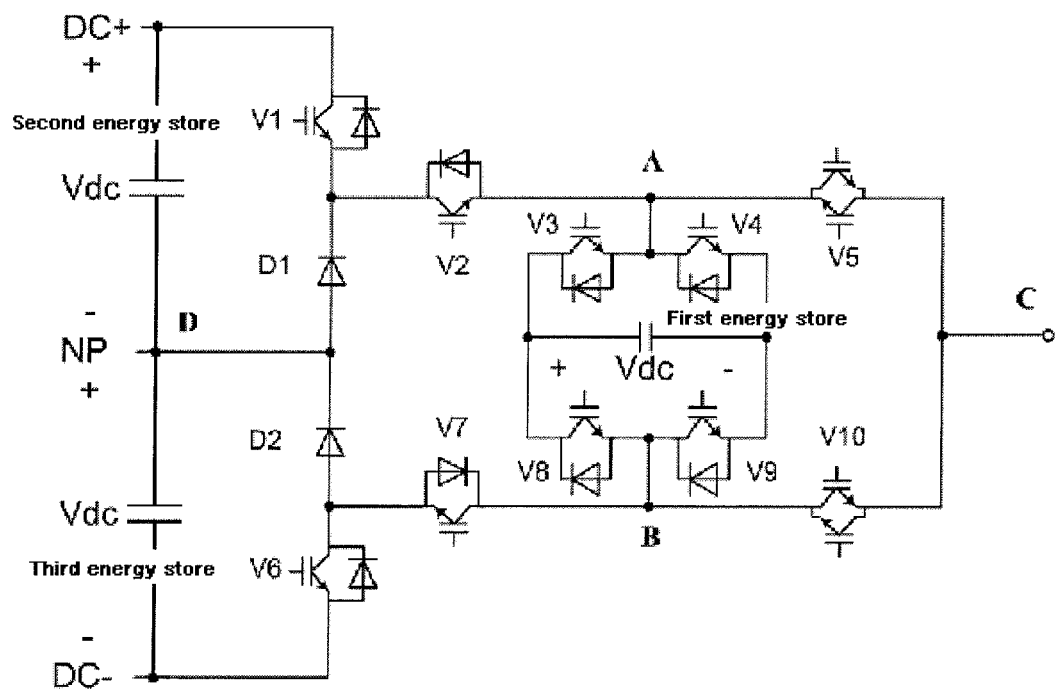
FIG. 6 illustrates a topology according to another embodiment of present invention.

FIG. 6 illustrates a topology according to another embodiment of present invention. The topology differs from that of FIG. 4 in the switching element and the first energy store. Particularly, as shown in FIG. 6, the switching element 42 comprises a seventh and eighth power semiconductors V3, V4 series-connected at a first junction point, a ninth and tenth power semiconductors V8, V9 series-connected at a second junction point-B, and a eleventh and twelfth power semiconductors V5, V10 series-connected at a third junction point. And, the eleventh power semiconductor V5 is connected with both of the first junction point and one of the first output terminals A and the twelfth power semiconductor V10 is connected with both of the second junction point and the other of the first output terminals B. Furthermore, the first energy store 41, the seventh and eighth power semiconductors V3, V4, and the ninth and tenth power semiconductors V8, V9 are arranged to be connected in parallel. Each of the seventh, eighth, ninth and eleventh, power semiconductors is a drivable unidirectional power semiconductor switch with an anti-paralleled uncontrolled unidirectional power semiconductor current-carrying semiconductor, such as IGCT or IGBT etc. Each of the tenth and twelfth power semiconductors is a drivable bidirectional power semiconductor switch.

Switching states of the topology according to FIG. 6 is shown in Table IX. For convenience of reading, the first, fourth, fifth, sixth, seventh, eighth, ninth, tenth, eleventh and twelfth power semiconductors are referenced as V1, V6, V2, V7, V3, V4, V8, V9, V5, V10, the second and third power semiconductors are referenced as D1, D2. Output voltage is the output at the second output terminal C, and for the purpose of specification, the voltage level of each of the first, second and third energy stores 41, 400, 401 is $V_{dc}$ with voltage polarity indicated in the figures. The row of "voltage" shows the voltage across each of the power semiconductors under each of the switching states.

TABLE IX

| State | V1 | V2 | V3 | V4 | V5 | V6 | V7 | V8 | V9 | V10 | Value | D1 | D2 |
|---|---|---|---|---|---|---|---|---|---|---|---|---|---|
| S1 | 1 | 1 | 0 | 1 | 0 | 0 | 0 | 1 | 0 | 1 | $2 * Vdc$ | N/A | N/A |
| $V_{DRM}$ | 0 | 0 | Vdc | 0 | Vdc | Vdc/2 | Vdc | 0 | Vdc | 0 | / | Vdc | Vdc/2 |

TABLE IX-continued

| State | V1 | V2 | V3 | V4 | V5 | V6 | V7 | V8 | V9 | V10 | Value | D1 | D2 |
|---|---|---|---|---|---|---|---|---|---|---|---|---|---|
| S2 | 1 | 1 | 0 | 0 | 1 | 0 | 0 | 0 | 0 | 0 | Vdc | N/A | N/A |
| $V_{DRM}$ | 0 | 0 | Vdc/2 | Vdc/2 | 0 | Vdc/2 | 0 | Vdc/2 | Vdc/2 | 0 | / | Vdc | Vdc/2 |
| S3 | 0 | 1 | 0 | 1 | 0 | 0 | 0 | 1 | 0 | 1 | Vdc | N/A | N/A |
| $V_{DRM}$ | Vdc | 0 | Vdc | 0 | Vdc | Vdc/2 | Vdc | 0 | Vdc | 0 | / | 0 | Vdc/2 |
| S4 | 0 | 1 | 0 | 0 | 1 | 0 | 0 | 0 | 0 | 0 | 0 | N/A | N/A |
| $V_{DRM}$ | Vdc | 0 | Vdc/2 | Vdc/2 | 0 | Vdc/2 | 0 | Vdc/2 | Vdc/2 | 0 | / | 0 | Vdc/2 |
| S5 | 1 | 1 | 1 | 0 | 0 | 0 | 0 | 1 | 1 | 0 | 0 | N/A | N/A |
| $V_{DRM}$ | 0 | 0 | 0 | Vdc | Vdc | Vdc/2 | 0 | Vdc | 0 | 0 | / | Vdc | Vdc/2 |
| S6 | 0 | 0 | 1 | 0 | 1 | 1 | 1 | 0 | 1 | 0 | 0 | N/A | N/A |
| $V_{DRM}$ | Vdc/2 | 0 | 0 | Vdc | 0 | 0 | 0 | Vdc | 0 | Vdc | / | Vdc/2 | Vdc |
| S7 | 0 | 0 | 0 | 0 | 0 | 0 | 1 | 0 | 0 | 1 | 0 | N/A | N/A |
| $V_{DRM}$ | Vdc/2 | 0 | Vdc/2 | Vdc/2 | 0 | Vdc | Vdc/2 | Vdc/2 | Vdc/2 | 0 | / | Vdc/2 | 0 |
| S8 | 0 | 0 | 0 | 1 | 1 | 0 | 1 | 1 | 0 | 0 | −Vdc | N/A | N/A |
| $V_{DRM}$ | Vdc/2 | Vdc | Vdc | 0 | 0 | Vdc | 0 | 0 | Vdc | Vdc | / | Vdc/2 | 0 |
| S9 | 0 | 0 | 0 | 0 | 0 | 1 | 1 | 0 | 0 | 1 | −Vdc | N/A | N/A |
| $V_{DRM}$ | Vdc/2 | 0 | Vdc/2 | Vdc/2 | 0 | 0 | 0 | Vdc/2 | Vdc/2 | 0 | / | Vdc/2 | Vdc |
| S10 | 0 | 0 | 0 | 1 | 1 | 1 | 1 | 1 | 0 | 0 | −2Vdc | N/A | N/A |
| $V_{DRM}$ | Vdc/2 | Vdc | Vdc | 0 | 0 | 0 | 0 | 0 | Vdc | Vdc | / | Vdc/2 | Vdc |

Under the switching state of S1, the first conducting path P1 is bidirectional. As shown in FIG. 6, the first conducting path P1 leads through the junction point between the second energy store and the first power semiconductor V1, the switching-on/free-wheeling first power semiconductor V1, the switching-on/free-wheeling fifth power semiconductor V2, and the first output terminal A. The voltage level at the first output terminal A is $V_{dc}$. Furthermore, from the first output terminal A, the first conducting path P1 leads through the switching-on/free-wheeling eight power semiconductor V4, the first energy store, the switching-on/free-wheeling ninth and twelfth power semiconductors V8, V10, and the second output terminal. With respect to point NP, the voltage output at the second output terminal C is $2V_{dc}$.

Under the switching state of S2, the first conducting path P1 is bidirectional. As shown in FIG. 6 the first conducting path P1 leads through the junction point between the second energy store and the first power semiconductor V1, the switching-on/free-wheeling first power semiconductor V1, the switching-on/free-wheeling fifth power semiconductor V2, and the first output terminal A. The voltage level at the first output terminal A is $V_{dc}$. Furthermore, from the first output terminal A, the first conducting path P1 leads through the switching-on/free-wheeling eleventh semiconductor V5 and the second output terminal C. With respect to point NP, the voltage output at the second output terminal C is $V_{dc}$.

Under the switching state of S3, the first conducting path P1 is unidirectional. As shown in FIG. 6, the first conducting path P1 leads through the junction point D between the second and third energy stores, the free-wheeling second power semiconductor D1, the switching-on fifth power semiconductor V2, and the first output terminal A; the first voltage level at the first output terminal A is 0. Furthermore, from the first output terminal A, the first conducting path P1 leads through the switching-on seventh power semiconductor V4, the first energy store, the switching-on/free-wheeling tenth and twelfth power semiconductors V8, V10, and the second output terminal. With respect to point NP, the voltage output at the second output terminal C is $V_{dc}$.

Under the switching state of S4, the first conducting path P1 is unidirectional. As shown in FIG. 6, the first conducting path P1 leads through the junction point D between the second and third energy stores, the free-wheeling second power semiconductor D1, the switching-on fifth power semiconductor V2, and the first output terminal A; the first voltage level at the first output terminal A is 0. Furthermore, from the first output terminal A, the first conducting path P1 leads through the switching-on/free-wheeling eleventh semiconductor V5 and the second output terminal C, and the second output terminal. With respect to point NP, the voltage output at the second output terminal C is 0.

Under the switching state of S5, the first conducting path P1 is bidirectional. As shown in FIG. 6, the first conducting path P1 leads through the junction point between the second energy store and the first power semiconductor V1, the switching-on/free-wheeling first power semiconductor V1, the switching-on/free-wheeling fifth power semiconductor V2, and the first output terminal A. The voltage level at the first output terminal A is $V_{dc}$. Furthermore, from the first output terminal A, the first conducting path P1 leads through the switching-on/free-wheeling seventh power semiconductor V3, the first energy store, the switching-on/free-wheeling tenth and twelfth power semiconductors V9, V10, and the second output terminal C. With respect to point NP, the voltage output at the second output terminal C is 0.

Under the switching state of S6, the first conducting path P1 is bidirectional. As shown in FIG. 6, the first conducting path P1 leads through the junction point between the third energy store and the fourth power semiconductor V6, the switching-on/free-wheeling fourth power semiconductor V6, the switching-on/free-wheeling sixth power semiconductor V7, the first energy store, the switching-on seventh power semiconductor and the second output terminal B; the first voltage level at the first output terminal B is the voltage level at junction point D (NP), for example $-V_{dc}$. Furthermore, from the first output terminal B, the switching-on/free-wheeling seventh, eleventh, tenth power semiconductors V3, V9, V5, and the second output terminal C. With respect to point NP, the voltage output at the second output terminal C is 0.

Under the switching state of S7, the first conducting path P1 is unidirectional. As shown in FIG. 6, the first conducting path P1 leads through the junction point D between the second and third energy stores, the free-wheeling third power semiconductor D2, the switching-on sixth power semiconductor V7, and the first output terminal B; the first voltage level at the first output terminal B is the voltage level at junction point D (NP), for example 0. Furthermore, from the first output terminal B, the first conducting path P1 leads through the switching-on/free-wheeling twelfth semiconductor V10 and the second output terminal C. With respect to point NP, the voltage output at the second output terminal C is 0.

Under the switching state of S8, the first conducting path P1 is unidirectional. As shown in FIG. 6, the first conducting path P1 leads through the junction point D between the second and third energy stores, the free-wheeling third power semiconductor D2, the switching-on sixth power semiconductor V7, and the first output terminal B; the first voltage level at the first output terminal B is the voltage level at junction point D (NP), for example 0. Furthermore, from the first output terminal B, the first conducting path P1 leads through the switching-on/free-wheeling ninth power semiconductor V8, the first energy store, the switching-on/free-wheeling eighth and eleventh power semiconductors V4, V5, and the second output terminal C. With respect to point NP, the voltage output at the second output terminal C is $-V_{dc}$.

Under the switching state of S9, the first conducting path P1 is bidirectional. As shown in FIG. 6, the first conducting path P1 leads through the junction point between the third energy store and the fourth power semiconductor V6, the switching-on/free-wheeling fourth power semiconductor V6, the switching-on/free-wheeling sixth power semiconductor V7, the first energy store, the switching-on seventh power semiconductor and the second output terminal B; the first voltage level at the first output terminal B is the voltage level at junction point D (NP), for example $-V_{dc}$. Furthermore, from the first output terminal B, the first conducting path P1 leads through the switching-on/free-wheeling twelfth semiconductor V10 and the second output terminal C. With respect to point NP, the voltage output at the second output terminal C is $-V_{dc}$.

Under the switching state of S10, the first conducting path P1 is bidirectional. As shown in FIG. 6, the first conducting path P1 leads through the junction point between the third energy store and the fourth power semiconductor V6, the switching-on/free-wheeling fourth power semiconductor V6, the switching-on/free-wheeling sixth power semiconductor V7, the first energy store, the switching-on seventh power semiconductor and the second output terminal B; the first voltage level at the first output terminal B is the voltage level at junction point D (NP), for example $-V_{dc}$. Furthermore, from the first output terminal B, the first conducting path P1 leads through the switching-on/free-wheeling ninth power semiconductor V8, the first energy store, the switching-on/free-wheeling eighth and eleventh power semiconductors V4, V5, and the second output terminal C. With respect to point NP, the voltage output at the second output terminal C is $-2V_{dc}$.

By having the topology of FIG. 6 and its switching states, the voltage class of each of the power semiconductors can be kept lower. This renders the reduction of the cost and the increase of the liability. Also, due to the bidirectional current flow to/from the first energy store during the operation, the voltage of the first energy store can be kept self-balanced.

Figure 7:
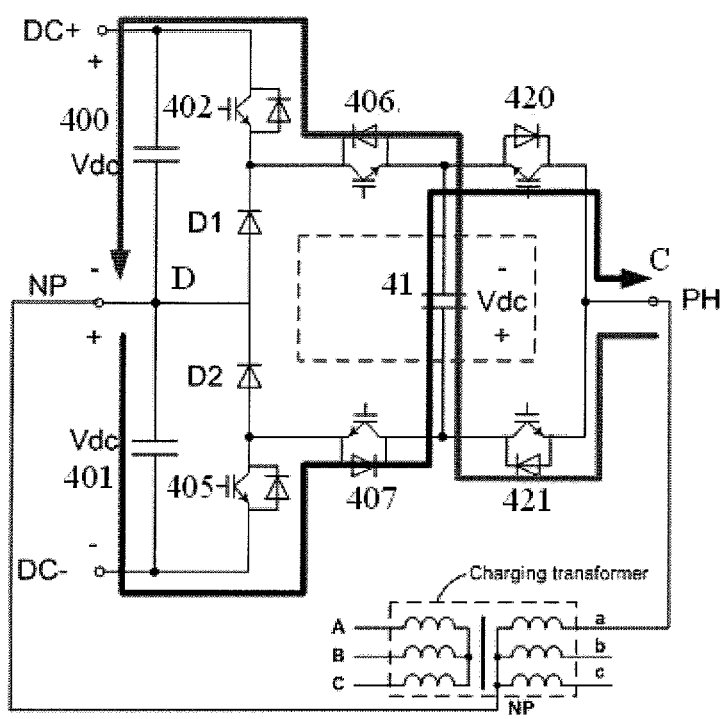
FIG. 7 illustrates a charging topology for the embodiment of present invention according to FIG. 4.

FIG. 7 illustrates a charging topology for the embodiment of present invention according to FIG. 4. It is clear to the skilled in the art that the charging topology could be also used for the embodiment according to FIG. 5. As shown in FIG. 7, a charging transformer 44 is connected between the junction point D between the second and third energy stores 400, 401 and the second output terminal C. The charging path can lead through the free-wheeling eight power semiconductor 421, the first energy store 41, the free-wheeling fifth power semiconductor 406, the free-wheeling first power semiconductor 402, and the second energy store 400; or the third energy store 401, the free-wheeling fourth power semiconductor 405, the free-wheeling sixth power semiconductor 407, the first energy store 41, and the free-wheeling seventh power semiconductor 420.

Figure 8:
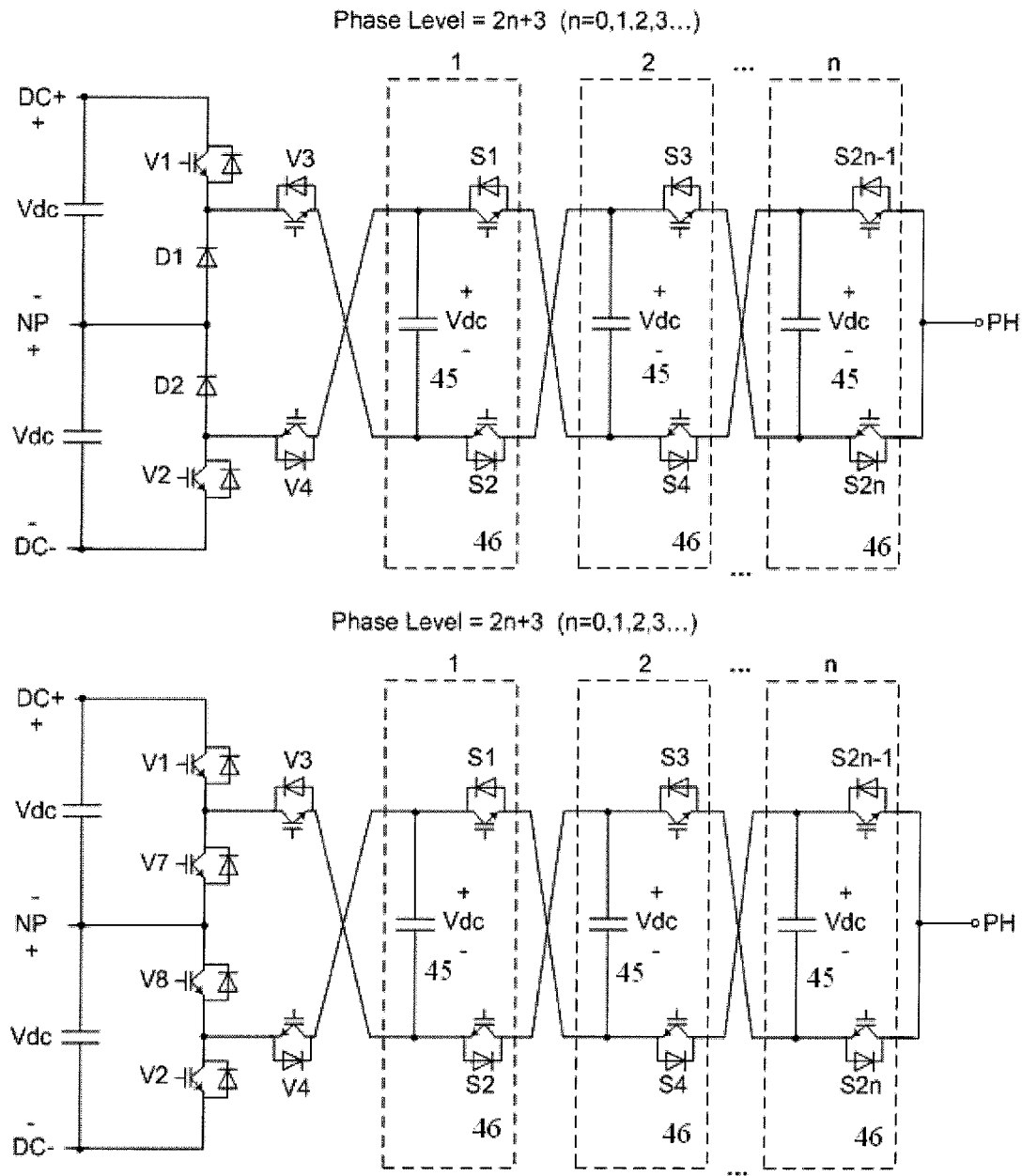
FIG. 8 illustrates a topology according to another embodiment of present invention.

FIG. 8 illustrates a topology according to another embodiment of present invention. As shown in FIG. 8, a voltage source converter according to each of previous embodiments, including but not limited to FIGS. 4 to 6, can generate a multiple levels of the second voltage at one of two second output terminals in a multiple of the first conducting paths P1. A fourth energy store 45 stores an electrical energy, for example a power capacitor with a voltage level $V_{dc}$. A second switching element 46 is directly connected with the second output terminal, and can switch the fourth energy store 45 in or out of the first conducting path P1 so as to combine a level of the voltage of the fourth energy store 45 with the level of the second voltage as a third voltage output at a third output terminal. A further energy store and a further switching element can be integrated directly with the output terminal of previous stage so as to output voltage levels as $3V_{dc}$, $4V_{dc}$, ... and $n+1\ V_{dc}$. By having the topology as above, the voltage class of each of the power semiconductors can be kept lower with the number of the power semiconductors unchanged relative to the number of output voltage level. In addition, since the addition of further switching element of next stage does not depend on the topology of the converter of previous stage, the number of level of the output voltage can be raised with the incorporation of more switching element for next stage without corresponding modification of the previous stage. This renders the reduction of the cost and the increase of the liability.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A voltage source converter, comprising:
a multi-level voltage source converter that outputs multiple levels of a first voltage at one of two first output terminals through a multiple of first conducting paths;
a first energy store; and
a first switching element, directly connected with the one of the two first output terminals, that switches the first energy store in or out of the multiple of the first conducting paths so as to combine a level of a voltage of the first energy store with a level of the first voltage as a second voltage output at a second output terminal;
wherein the multi-level voltage source converter comprises:
a second energy store;
a third energy store connected with the second energy store in series;
a first, a second, a third and a fourth power semiconductor connected in series, wherein the first power semiconductor is connected to the second energy store, the fourth power semiconductor is connected to the third energy store, a junction point between the second and the third energy stores is connected to a junction point between the second and the third power semiconductors;
a fifth power semiconductor connected between a junction point between the first and second power semiconductors and one of the first output terminals and in series with the first power semiconductor;
a sixth power semiconductor connected between a junction point between the third and fourth power semiconductors and the other of the first output terminals and in series with the fourth power semiconductor; and wherein each of the first, the second, the third, the fourth, the fifth and the sixth power semiconductor is a drivable unidirectional power semiconductor switch with an anti-paralleled uncontrolled unidirectional current-carrying semiconductor.

2. A voltage source converter, comprising:
a multi-level voltage source converter that outputs multiple levels of a first voltage at one of two first output terminals through a multiple of first conducting paths;
a first energy store; and
a first switching element, directly connected with the one of the two first output terminals, that switches the first energy store in or out of the multiple of the first conducting paths so as to combine a level of a voltage of the first energy store with a level of the first voltage as a second voltage output at a second output terminal;
wherein the multi-level voltage source converter comprises:
a second energy store;
a third energy store connected with the second energy store in series;
a first and a second power semiconductor connected in anti-series;
a third and a fourth power semiconductor connected in anti-series, wherein the second and the third power semiconductors are connected in series, the first power semiconductor is connected to the second energy store, the fourth power semiconductor is connected to the third energy store, a junction point between the second and the third energy stores is connected to a junction point between the second and the third power semiconductors;
a fifth power semiconductor connected between the first power semiconductor and one of the first output terminals and in series with the first power semiconductor;
a sixth power semiconductor connected between the fourth power semiconductor and the other of the first output terminals and in series with the fourth power semiconductor;
wherein each of the first, the fourth, the fifth and the sixth power semiconductor is a drivable unidirectional power semiconductor switch with an anti-paralleled uncontrolled unidirectional current-carrying semiconductor, and either of the second and the third power semiconductors is an uncontrolled unidirectional current-carrying direction semiconductor.

3. The voltage source converter according to claim 1, wherein:
the first conducting path leads through:
the junction point between the second energy store and the first power semiconductor, the first power semiconductor, the fifth power semiconductor, and the first output terminal;
the junction point between the second and third energy stores, the second power semiconductor, the fifth power semiconductor, and the first output terminal;
the junction point between the second and third energy stores, the third power semiconductor, the sixth power semiconductor, and the first output terminal; or
the junction point between the third energy store and the fourth power semiconductor, the fourth power semiconductor, the sixth power semiconductor, and the first output terminal.

4. The voltage source converter according to claim 1, wherein:
the first switching element comprises a first and a second power semiconductor connected in series, either of the first or the second power semiconductor is a drivable unidirectional power semiconductor switch with an anti-paralleled uncontrolled unidirectional power semiconductor; and
the first energy store is connected with the first switching element in parallel between the two first output terminals.

5. The voltage source converter according to claim 1, wherein the first conducting path leads through:
the first energy store, the eighth power semiconductor and the second output terminal;
the seventh power semiconductor and the second output terminal;
the eighth power semiconductor and the second output terminal; or
the first energy store, the seventh power semiconductor and the second output terminal; and
the second output terminal is arranged on a junction between the seventh and the eighth power semiconductors, and adapted to output the second voltage.

6. The voltage source converter according to claim 1, further comprising:
a charging transformer connected between the junction point between the second and third energy stores and the second output terminal.

7. The voltage source converter according to claim 1, wherein:
the first switching element comprises a seventh and an eighth power semiconductor connected in series, either of the seventh or the eighth power semiconductor is a drivable unidirectional power semiconductor switch with an anti-paralleled uncontrolled unidirectional current-carrying semiconductor; and
the first energy store is connected with the first switching element in parallel between the two first output terminals;
further comprising:
a charging transformer connected between the junction point between the second and third energy stores and the second output terminal.

8. The voltage source converter according to claim 7, wherein:
the charging path leads through:
the eighth power semiconductor, the first energy store, the fifth power semiconductor, the first power semiconductor, and the second energy store; or
the third energy store, the fourth power semiconductor, the sixth power semiconductor, the first energy store, and the seventh power semiconductor.

9. The voltage source converter according to claim 2, wherein:
the first conducting path leads through:
the junction point between the second energy store and the first power semiconductor, the first power semiconductor, the fifth power semiconductor, and the first output terminal;
the junction point between the second and third energy stores, the second power semiconductor, the fifth power semiconductor, and the first output terminal;
the junction point between the second and third energy stores, the third power semiconductor, the sixth power semiconductor, and the first output terminal; or
the junction point between the third energy store and the fourth power semiconductor, the fourth power semiconductor, the sixth power semiconductor, and the first output terminal.

10. The voltage source converter according to claim 1, wherein:
the first switching element comprises a seventh and an eighth power semiconductor connected in series, either of the seventh or the eighth power semiconductor is a drivable unidirectional power semiconductor switch with an anti-paralleled uncontrolled unidirectional power semiconductor; and
the first energy store is connected with the first switching element in parallel between the two first output terminals.

11. The voltage source converter according to claim 2, wherein:
the first switching element comprises a seventh and an eighth power semiconductor connected in series, either of the seventh or the eighth power semiconductor is a drivable unidirectional power semiconductor switch with an anti-paralleled uncontrolled unidirectional power semiconductor; and
the first energy store is connected with the first switching element in parallel between the two first output terminals.

12. The voltage source converter according to claim 1, wherein:
the first switching element comprises:
a seventh and an eighth power semiconductor series-connected at a first junction point;
a ninth and a tenth power semiconductor series-connected at a second junction point;
an eleventh and a twelfth power semiconductor anti-series-connected at a third junction point; and
the eleventh power semiconductor is connected with both of the first junction point and one of the first output terminals and the twelfth power semiconductor is connected with both of the second junction point and the other of the first output terminals; and
the first energy store, the seventh and the eighth power semiconductors, and the ninth and the tenth power semiconductors are connected in parallel;
each of the seventh, the eighth, the ninth, the tenth, the eleventh, and the twelfth power semiconductors is a drivable unidirectional power semiconductor switch with an anti-paralleled uncontrolled unidirectional current-carrying semiconductor.

13. The voltage source converter according to claim 2, wherein:
the first switching element comprises:
a seventh and an eighth power semiconductor series-connected at a first junction point;
a ninth and a tenth power semiconductor series-connected at a second junction point;
an eleventh and a twelfth power semiconductor anti-series-connected at a third junction point; and
the eleventh power semiconductor is connected with both of the first junction point and one of the first output terminals and the twelfth power semiconductor is connected with both of the second junction point and the other of the first output terminals; and
the first energy store, the seventh and the eighth power semiconductors, and the ninth and the tenth power semiconductors are connected in parallel;
each of the seventh, the eighth, the ninth, the tenth, the eleventh, and the twelfth power semiconductors is a drivable unidirectional power semiconductor switch with an anti-paralleled uncontrolled unidirectional current-carrying semiconductor.

14. The voltage source converter according to claim 2, further comprising:
a charging transformer connected between the junction point between the second and third energy stores and the second output terminal.

15. The voltage source converter according to claim 2, wherein:
the first switching element comprises a seventh and an eighth power semiconductor connected in series, either of the seventh or the eighth power semiconductor is a drivable unidirectional power semiconductor switch with an anti-paralleled uncontrolled unidirectional current-carrying semiconductor; and
the first energy store is connected with the first switching element in parallel between the two first output terminals;
further comprising:
a charging transformer connected between the junction point between the second and third energy stores and the second output terminal.

16. The voltage source converter according to claim 8, comprising:
a fourth energy store; and
a second switching element, directly connected with the second output terminal, that switches the fourth energy store in or out of the first conducting path so as to combine a level of a voltage of the fourth energy store with the level of the second voltage as a third voltage output at a third output terminal.

17. The voltage source converter according to claim 2, wherein:
the first switching element comprises a first and a second power semiconductor connected in series, either of the first or the second power semiconductor is a drivable unidirectional power semiconductor switch with an anti-paralleled uncontrolled unidirectional power semiconductor; and
the first energy store is connected with the first switching element in parallel between the two first output terminals.

18. The voltage source converter according to claim 17, wherein the first conducting path leads through:
the first energy store, the eighth power semiconductor and the second output terminal;
the seventh power semiconductor and the second output terminal;
the eighth power semiconductor and the second output terminal; or
the first energy store, the seventh power semiconductor and the second output terminal; and
the second output terminal is arranged on a junction between the seventh and the eighth power semiconductors, and adapted to output the second voltage.

* * * * *